(12) United States Patent
Earl et al.

(10) Patent No.: US 11,724,750 B2
(45) Date of Patent: Aug. 15, 2023

(54) FENDER CAP BRACKET, MUD FLAP MOUNTING BRACKET, AND RELATED METHODS OF INSTALLATION AND USE

(71) Applicant: Truck Hardware Ltd., Lethbridge (CA)

(72) Inventors: Alison Earl, Lethbridge (CA); James Earl, Lethbridge (CA); Darwin Earl, Lethbridge (CA); Ryan Earl, Lethbridge (CA)

(73) Assignee: TRUCK HARDWARE LTD., Lethbridge (CA)

( * ) Notice: Subject to any disclaimer, the term of this patent is extended or adjusted under 35 U.S.C. 154(b) by 23 days.

(21) Appl. No.: 17/182,140

(22) Filed: Feb. 22, 2021

(65) Prior Publication Data

US 2021/0261201 A1   Aug. 26, 2021

(30) Foreign Application Priority Data

Feb. 21, 2020   (CA) .............................. CA 3073408

(51) Int. Cl.
*B62D 25/18*       (2006.01)
*B62D 25/16*       (2006.01)

(52) U.S. Cl.
CPC ......... *B62D 25/188* (2013.01); *B62D 25/168* (2013.01)

(58) Field of Classification Search
CPC ..... B62D 25/18; B62D 25/168; B62D 25/188
See application file for complete search history.

(56) References Cited

U.S. PATENT DOCUMENTS

| 3,497,238 A | | 2/1970 | Carlton | |
|---|---|---|---|---|
| 3,713,669 A | * | 1/1973 | Evans | B62D 25/188 280/851 |
| 3,726,544 A | * | 4/1973 | Miller | B62D 25/188 280/851 |

(Continued)

FOREIGN PATENT DOCUMENTS

| AU | 2009208140 B1 * | 5/2010 | ........... B62D 25/188 |
|---|---|---|---|
| CA | 2371615 | 10/2008 | |

(Continued)

OTHER PUBLICATIONS

Truck Hardware Ltd., Gatorback2019 Ram 1500 Rear Install, screenshots of YouTube video, available as early as Jul. 6, 2018, URL = https://www.youtube.com/watch?v=IHpPfmX5hSw; retrieved Jul. 11, 2022 (Year: 2018).*

(Continued)

*Primary Examiner* — Steve Clemmons
(74) *Attorney, Agent, or Firm* — Robert A. Nissen

(57) ABSTRACT

An apparatus includes a fender base cap bracket shaped to cover a base of a fender of a vehicle; a fender mount defined on the fender base cap bracket; and a mud flap mount defined on the fender base cap bracket. A kit has a fender base cap bracket shaped to cover a base of a fender of a vehicle, the fender base cap bracket having a fender mount defined on the fender base cap bracket, and a mud flap mount defined on the fender base cap bracket; and a mud flap structured to mount to the mud flap mount. A method involves securing a fender base cap bracket to a base of a fender of a vehicle, such that the fender base cap bracket covers the base of the fender, the fender base cap bracket defining a mud flap mount.

14 Claims, 10 Drawing Sheets

(56) References Cited

U.S. PATENT DOCUMENTS

| | | | |
|---|---|---|---|
| 3,953,053 A | | 4/1976 | Arenhold |
| 4,012,053 A | | 3/1977 | Bode |
| 4,323,262 A | * | 4/1982 | Arenhold ............... B62D 25/18 403/312 |
| 4,326,727 A | * | 4/1982 | Rock ...................... B62D 25/18 248/316.7 |
| 4,382,606 A | | 5/1983 | Lightle et al. |
| 4,585,243 A | | 4/1986 | Lockwood |
| 4,605,238 A | | 8/1986 | Arenhold |
| 4,620,745 A | * | 11/1986 | Jacobs ................... B62D 25/18 52/716.6 |
| 4,629,204 A | * | 12/1986 | Arenhold ............... B62D 25/18 280/851 |
| 4,690,419 A | | 9/1987 | Hoshal |
| 4,709,938 A | * | 12/1987 | Ward ..................... B62D 25/18 280/851 |
| 4,715,648 A | * | 12/1987 | Hensel ................... B62D 25/18 280/850 |
| 5,044,667 A | * | 9/1991 | Manning ............... B62D 25/188 280/851 |
| 5,915,708 A | * | 6/1999 | Silva ..................... B62D 25/188 280/154 |
| 6,135,502 A | * | 10/2000 | Howe .................... B62D 25/188 280/847 |
| 6,164,804 A | | 12/2000 | Self |
| 6,729,652 B2 | | 5/2004 | Cicansky |
| 6,938,929 B2 | | 9/2005 | Cicansky |
| 6,938,930 B1 | | 9/2005 | Beach |
| 7,066,493 B2 | | 6/2006 | Cicansky |
| 7,213,843 B2 | | 5/2007 | Edwards |
| 7,607,698 B2 | * | 10/2009 | Cicansky ............. B62D 25/188 280/154 |
| 9,211,916 B1 | | 12/2015 | Rosenbecker |
| 9,434,419 B1 | * | 9/2016 | Casto, Jr. ............. B62D 25/182 |
| 9,862,426 B2 | | 1/2018 | Lordanou |
| 9,963,174 B1 | * | 5/2018 | Cooper ................. B62D 25/188 |
| 10,252,753 B2 | * | 4/2019 | Johnson ................ B62D 25/16 |
| 10,668,955 B2 | * | 6/2020 | Siegel .................. B62D 25/161 |
| 2003/0151243 A1 | | 8/2003 | Horinek ................ B62D 25/18 280/848 |
| 2006/0208476 A1 | * | 9/2006 | Collins ................. B62D 25/188 280/851 |
| 2007/0102917 A1 | * | 5/2007 | Hopkins ............... B62D 25/188 280/854 |
| 2007/0187940 A1 | * | 8/2007 | Presby .................. B62D 25/18 280/848 |
| 2018/0009485 A1 | | 1/2018 | Johnson |
| 2021/0094620 A1 | * | 4/2021 | Vu ....................... B62D 25/168 |

FOREIGN PATENT DOCUMENTS

| | | | | |
|---|---|---|---|---|
| CN | 106741209 A | * | 5/2017 | |
| CN | 106892003 A | * | 6/2017 | |
| DE | 2918830 | | 11/1980 | |
| DE | 19515624 A1 | * | 10/1996 | ........... B60R 19/565 |
| GB | 2272410 A | * | 5/1994 | ........... B62D 25/188 |

OTHER PUBLICATIONS

WeatherTech, WeatherTech No-Drill MudFlaps: Product Information, screenshots of a youtube video, available as early as Jun. 21, 2013, 2 pages, URL=https://www.youtube.com/watch?v=CamqGjBiTaY.

Precision Canada, How to Install Mud Flaps on a 2017 Dodge RAM 2500, screenshots of a youtube video, available as early as Aug. 8, 2017, 2 pages, URL=https://www.youtube.com/watch?v=N9sjiWC5Lfk.

Precision Canada, Bushwacker Flares and Mud Flap "Protective" Install Process, screenshots of a youtube video, available as early as Dec. 14, 2016, 2 pages, URL=https://www.youtube.com/watch?v=53xKI-FtT4c.

Truck Hardware, Gatorback Mudflap Install on 2016 GMC Sierra 1500 (Rear), screenshots of a youtube video, available as early as May 20, 2016, 2 pages, URL=https://www.youtube.com/watch?v=bPG0w7y65Yg.

Broncocarl92, WeatherTech no drill mud flaps install on a 2017 GMC Sierra, screenshots of a youtube video, available as early as Jun. 9, 2017, 2 pages, URL=https//www.youtube.com/watch?v=dVfPZv7Nj5k.

Truck Hardware, Gatorback Mudflap Install on 2016 GMC Sierra 1500 (Front), screenshots of a youtube video, available as early as May 17, 2016, 2 pages, URL=https://www.youtube.com/watch?v=XDhhkL7aX20.

Canadian Intellectual Property Office, Official Action for application 3,073,403, dated Jun. 2, 2021, 7 pages.

Canadian Intellectual Property Office, Official Action for application 3,073,403, dated Oct. 21, 2021, 4 pages.

Truck Hardware Ltd., GMC Sierra Finishing End Caps Installation, screenshots of YouTube video, available as early as Jun. 26, 2019,, URL = https://www.youtube.com/watch?v=_JAb38Um174.

Truck Hardware Ltd., GMC Sierra 1500 Rear Gatorback CS Offset Mud Flaps Install, screenshots of YouTube video, available as early as Nov. 20, 2019, pages, URL = https://www.youtube.com/watch?v=HtzHqr9Z-Zw.

Truck Hardware Ltd., GMC Sierra 1500 Front Gatorback CS Offset Mud Flaps Install, screenshots of YouTube video, available as early as Nov. 20, 2019, pages, URL = https://www.youtube.com/watch?v=L-1peisHG6o.

* cited by examiner

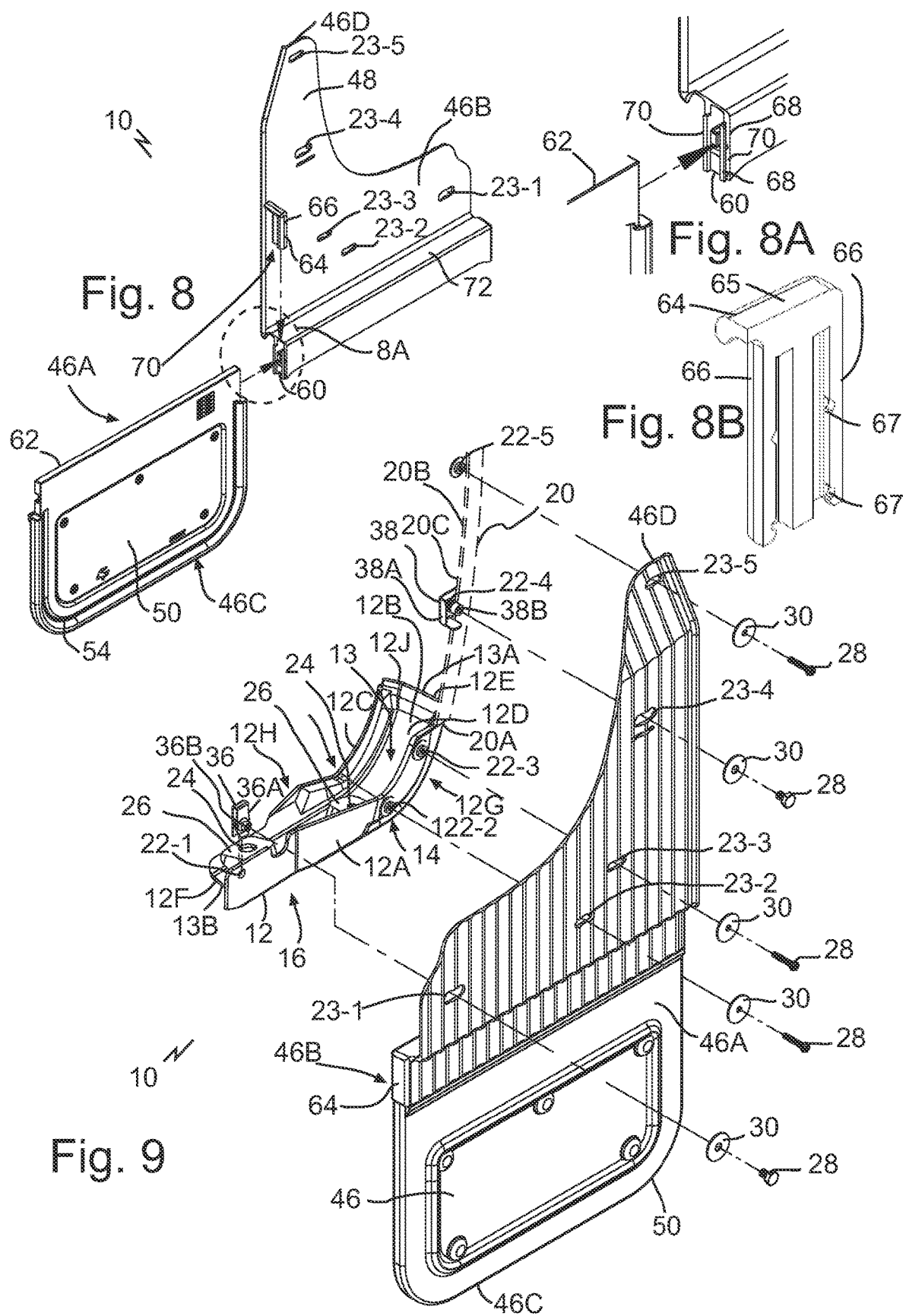

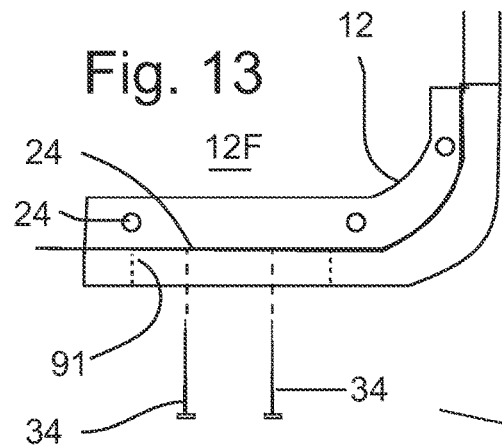
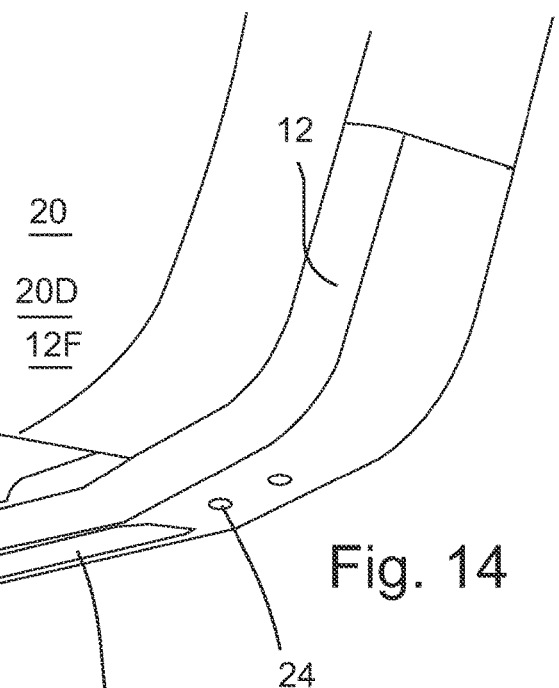
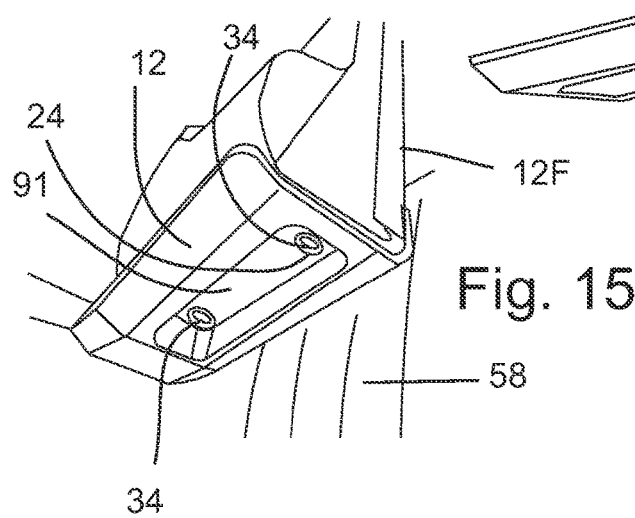
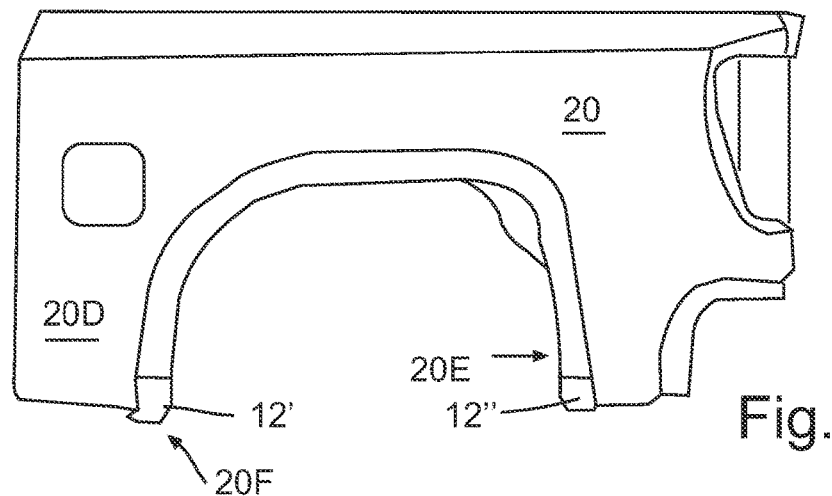

FENDER CAP BRACKET, MUD FLAP MOUNTING BRACKET, AND RELATED METHODS OF INSTALLATION AND USE

TECHNICAL FIELD

This document relates to fender cap brackets, mud flap mounting brackets, and related methods, including methods of installation and use.

BACKGROUND

The following paragraphs are not an admission that anything discussed in them is prior art or part of the knowledge of persons skilled in the art.

Mud flaps such as those manufactured by Precision Design & Manufacturing™ from Westlock, Alberta, are mounted directly to the inside of a fender of a vehicle, usually a truck, using fasteners.

SUMMARY

An apparatus is disclosed comprising: a fender base cap bracket shaped to cover a base of a fender of a vehicle; a fender mount defined on the fender base cap bracket. In some cases a mud flap mount may be defined on the fender base cap bracket.

A kit is disclosed comprising: a fender base cap bracket shaped to cover a base of a fender of a vehicle, the fender base cap bracket having a fender mount defined on the fender base cap bracket. In some cases a mud flap mount may be defined on the fender base cap bracket; and a mud flap structured to mount to the mud flap mount.

A method is disclosed comprising securing a fender base cap bracket to a base of a fender of a vehicle, such that the fender base cap bracket covers the base of the fender. In some cases the fender base cap bracket defines a mud flap mount.

A method is disclosed comprising replacing a first fender base cap bracket from a front or rear base of a fender of a vehicle, and securing a second fender base cap bracket to the front or rear base of the fender of the vehicle, such that the fender base cap bracket covers the front or rear base of the fender.

In various embodiments, there may be included any one or more of the following features: The fender base cap bracket has a front side wall and a base flange that collectively form a fender base receiving channel; and the mud flap mount is formed in the front side wall. The fender base cap bracket has a rear side wall that cooperates with the front side wall and the base flange to form the fender base receiving channel. The rear side wall comprises an adhesive. The adhesive is part of a peel and stick strip. The fender base cap bracket has an outboard channel end wall that is structured to terminate an outboard end of the fender base receiving channel. The outboard channel end wall is structured to form a portion of a fender molding. The base flange and the outboard channel end wall collectively form a J-shaped profile from an inboard end of the base flange up to and including the outboard channel end wall. The fender mount comprises a plurality of fender mount fastener receiving apertures. The fender mount fastener receiving apertures are formed in the base flange. The fender mount fastener receiving apertures are defined within fastener posts structured in the base flange. The mud flap mount comprises a plurality of mud flap mount fastener receiving apertures. The mud flap mount fastener receiving apertures are formed in the front side wall. A spring nut clip mounted to the front side wall and forming a mud flap mount fastener receiving aperture. A mud flap secured to the mud flap mount. A plurality of mud flap mounting fasteners securing the mud flap to the mud flap mount. The fender mount of the fender base cap bracket is secured to a fender of a vehicle. A plurality of fender mounting fasteners securing the fender base cap bracket to the vehicle. A mud flap mounting clip that is mounted to a lip of the fender and defines a fender mount fastener aperture that receives a mud flap mounting fastener to secure the mud flap to the fender. The lip defines an inner edge of a fender molding. Securing a mud flap to the mud flap mount of the fender base cap bracket. Securing the mud flap comprises securing fasteners through cooperating apertures in the mud flap and the mud flap mount. Securing the mud flap comprises securing a fastener through cooperating apertures in the mud flap and a spring nut clip mounted to the fender base cap bracket. Securing the mud flap comprises securing fasteners through cooperating apertures in the mud flap and the fender. Securing further comprises securing a fastener through cooperating apertures in the mud flap and a mud flap mounting clip that is mounted to a lip of the fender. Securing the fender base cap bracket to the fender via a peel and stick adhesive. The fender base cap bracket is secured to the base of the fender of the vehicle to replace a fender base cap previously mounted to the base of the fender of the vehicle. Before securing the fender base cap bracket to the vehicle, removing the fender base cap from the vehicle. The fender base cap forms a splash guard or mud flap. Securing the mud flap comprises securing fasteners through cooperating apertures in the fender. The fender base cap bracket has a front side wall, a base flange, and a rear side wall that collectively form a fender base receiving channel. The fender base cap bracket has an outboard channel end wall that terminates an outboard end of the fender base receiving channel flush with an outboard wall of a fender molding of the fender.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the figures, in which like reference characters denote like elements, by way of example, and in which:

FIG. 8 is a rear isometric exploded view of another embodiment of a mud flap comprising an upper hanger body and a lower flap body joined by way of a track and a guide for quick release and connection.

FIG. 8A is a close-up view of the area delineated by the 8A dashed lines in FIG. 8.

FIG. 8B is an isometric detail view of the retainer cap shown in FIG. 8A, with the side shown in FIG. 8B being opposite to the side shown in FIG. 8A.

FIG. 9 is a front isometric exploded view of the mud flap of FIG. 8 being mounted with associated fasteners to a fender base cap bracket and front left fender.

FIGS. 13-15 are end, rear perspective, and base perspective, views, respectively, of a fender base cap bracket located on the inside front of the left front fender on a truck.

FIG. 16 is a side elevation view of a fender, illustrating fender base cap brackets on both or one of the front and rear bases of the fender.

DETAILED DESCRIPTION

Figure 1:
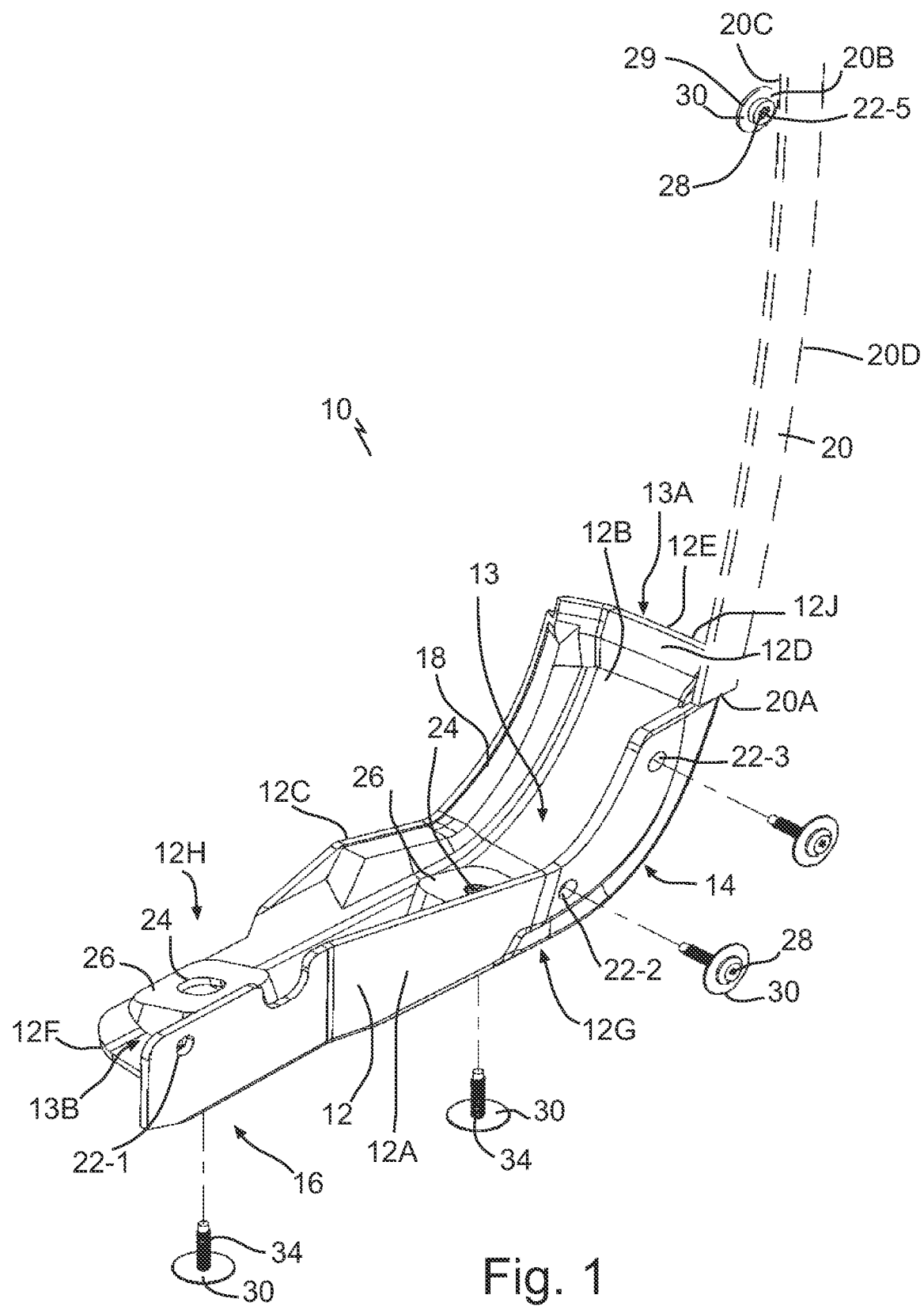
FIG. 1 is a front isometric view of a fender base cap bracket secured to the front left fender (shown in dashed lines) of a vehicle with associated fasteners.

Immaterial modifications may be made to the embodiments described here without departing from what is covered by the claims.

Trucks and other road-based or off-road vehicles equipped with rubber tires may pose a risk to other vehicles or themselves when tires are driven to rotate in the presence of road debris. Debris such as mud or stones may become picked up by a tread of a tire and propelled by the spinning motion of the tire. Propelled debris form projectiles that may strike the vehicle itself, another vehicle, a pedestrian, or adjacent building of infrastructure, potentially causing damage, injury, or wear. In some cases, propelled debris cause impeded visibility in the case of mud, water, snow, or ice projected onto a window of the vehicle or of an adjacent vehicle.

A body of a truck, car or other road-based or off-road vehicle is often shaped to incorporate fenders, which are shrouds that partially or fully cover and sometimes conform to the shape of a rotating wheel. A fender may be separate from the body of the vehicle, in which case it is sometimes termed a wing, or a fender may (more commonly) be incorporated into the body of the vehicle. A fender may be stamped from a thin sheet or sheets of metal or may be molded from plastic or composite materials. The under surface of a fender that most immediately conforms to the shape of a wheel may be termed a wheel well. A wheel well may generally conform loosely to the shape of the wheel with sufficient clearance to accommodate suspension travel and permit movement of the wheel relative to the structural body of the car. The fender may form part of a body panel of the vehicle, such as a quarter panel in the case of a fender for the rear wheels. A quarter panel is a body panel that in addition to enclosing a wheel covers an area of a vehicle between a door and a trunk at the rear of the vehicle. A body panel analogous to a quarter panel but provided for the front wheels of the car is typically redundantly called a fender, and incorporates the fender structure with the wheel well. A fender may have a variety of parts.

The fender may comprise one or more panels and include features such as cosmetic trim panels, sometimes termed molding or fender flares. A fender flare may be shaped to extend the fender in the outboard direction to provide a wider shroud to contain flying road debris and/or to provide a structure that is wider than stock tires. A fender flare may be provided by the original equipment manufacturer (OEM) of a vehicle, or may be supplied as an aftermarket part or part of an aftermarket kit. If a vehicle is retrofitted with tires wider than those supplied by the OEM, it may be beneficial to equip the vehicle with an aftermarket fender flare that corresponds with the wider tires. A fender molding may form an arcuate flange that is shaped to extend outward from the wheel well in radial directions at the outboard end of the fender along the external body of the vehicle relative to a rotational axis of the wheel. Fender molding, including flares, also have cosmetic purposes. In general, it may be desirable for aftermarket body accessories such as fender flares or molding to be installed without requiring, or with minimizing the requirement if any for, drilled holes in the structural or weatherproofing body elements of the vehicle, including in the wheel well or fender itself.

It may be desirable to equip a vehicle with mud flaps. Mud flaps may be especially desired for use in areas where heavy road debris may be encountered such as when driving on dirt or gravel roads. A mud flap may be a rigid or flexible panel that hangs from or is otherwise suspended below the trailing edge of a fender. A mud flap may provide a more effective barrier against flying debris than a stock or other fender design, including a splash guard. A mud flap may comprise flexible or resilient materials such as rubber so as to flex during use without adding rigid structure to the vehicle that would otherwise negatively impact the ground clearance of the vehicle. A mud flap may comprise rigid or stiff elements such as a hanger or backing, for instance made from sheet or molded metal or a polymer or plastic such as glass-reinforced nylon. A resilient or flexible mud flap such as a rubber mud flap may provide relatively high shock absorption to cushion the impact of flying debris, reduce bouncing or redirection of such debris, and may have sufficient ruggedness for longevity of the mud flap.

Mud flaps may provide various advantages and may incorporate various features or characteristics. A soiled mud flap may be relatively easier to clean than would be the body of the vehicle in the absence of the mud flap. A mud flap may be removed when desired, for example to reduce aerodynamic drag, or to replace, repair, or clean the mud flap. A mud flap may have a cosmetic or decorative function. An OEM may supply a vehicle with mud flaps, or more commonly a set of mud flaps may be obtained and installed to a vehicle as an aftermarket product of part of an aftermarket kit. A mud flap may in whole or in part be structured to include an offset, which refers to the incorporation of structure that provides additional separation, along the axis of vehicle travel, between the plane of the mud flap and the axis of the rotating wheel relative to a flat mud flap that depends vertically from the trailing edge of the fender. An offset may be required to reduce or prevent contact between the mud flap and the tire, as the mud flap hangs below the fender and may otherwise bend or bump the tire in use.

The inventor's own disclosure in Canadian patent no. 2,371,615 teaches a mud flap with a decorative panel that may be installed on a vehicle, and is a characteristic example of an aftermarket mud flap. Examples of such mud flaps may comprise a hanger that is secured to the fender of a vehicle using fasteners, and a decorative panel that is secured to the hanger with fasteners and fulfills the impact absorption function of the flap.

In some vehicles, such as the 2019 General Motors of Canada (GMC)™ Sierra™ pickup truck, certain trim elements within or attached to a fender by the OEM may be desirable to remove prior to installing a mud flap to the fender. In some cases the trim element or fender may obstruct the installation of a mud flap, for example by lacking suitable mounting points or structure to permit mounting of the mud flap, providing unsuitable or insufficiently rigid materials to permit proper mounting of the mud flap, or providing insufficient clearance between wheel and fender to permit mud flap mounting. In some cases, the pre-existing trim element or fender may visually obstruct part or all of the mud flap if installed. In one example of the latter, the 2019 GMC™ Sierra™ comprises OEM-supplied splash guard caps, which are mounted to the lower base end of each fender of the truck, at the trailing end of the wheel well. The OEM-supplied splash guard caps have the functions of covering a seam between adjacent body panels for cosmetic reasons, to prevent the ingress of debris into the body, and also comprise a skirt that intercepts debris and liquids thrown from a rotating tire. The splash guards may also provide an aerodynamic benefit. While a splash guard may fulfill some or all of the functions of a mud flap, a stock splash guard may be insufficiently wide, deep and/or suitable to intercept heavy mud and debris. The stock splash guards in such an example are integral parts of the fender itself.

Figure 2:
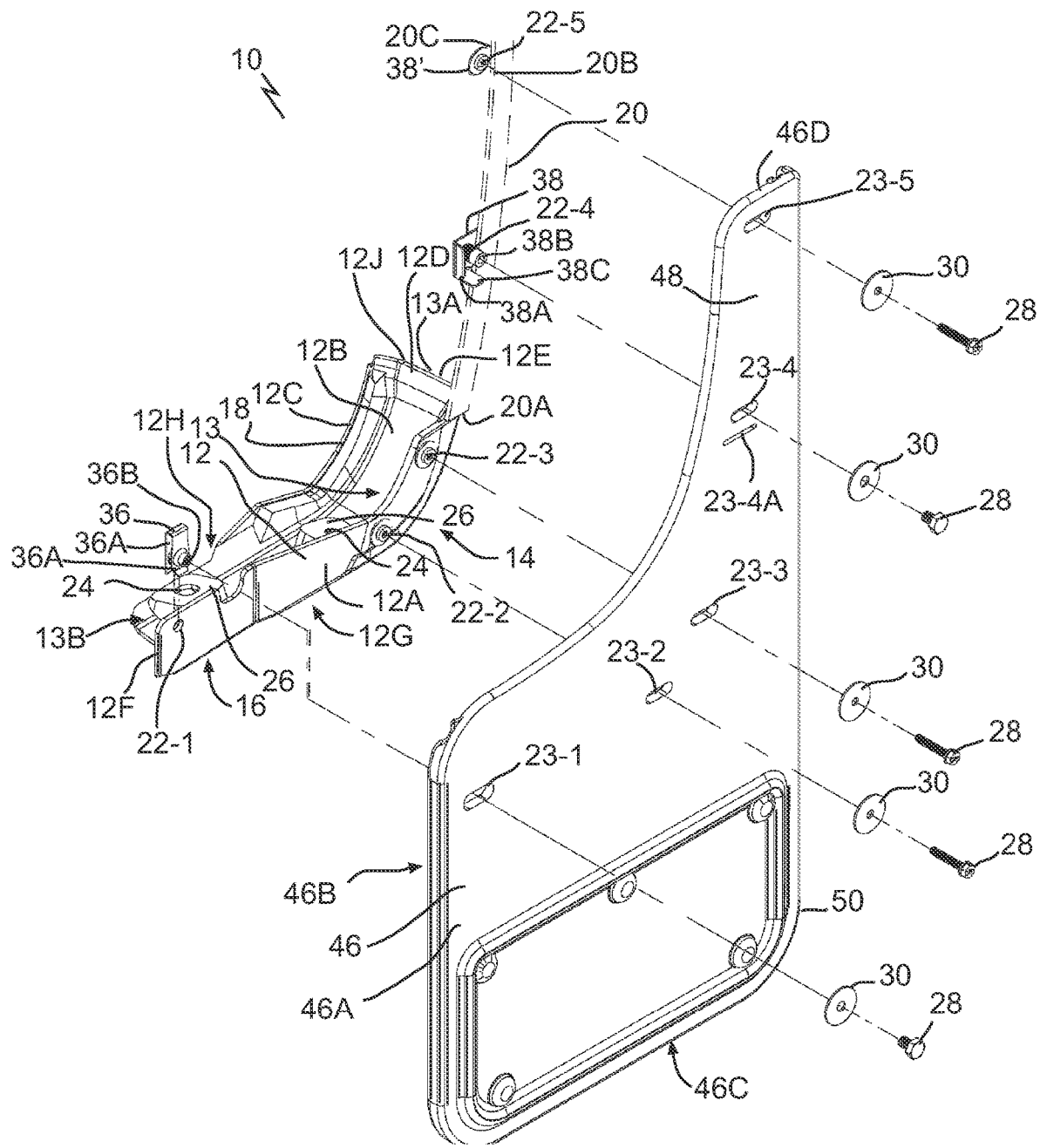
FIG. 2 is a front isometric exploded view of the fender base cap bracket and fender of FIG. 1, with a mud flap and associated fasteners.
Figure 3:
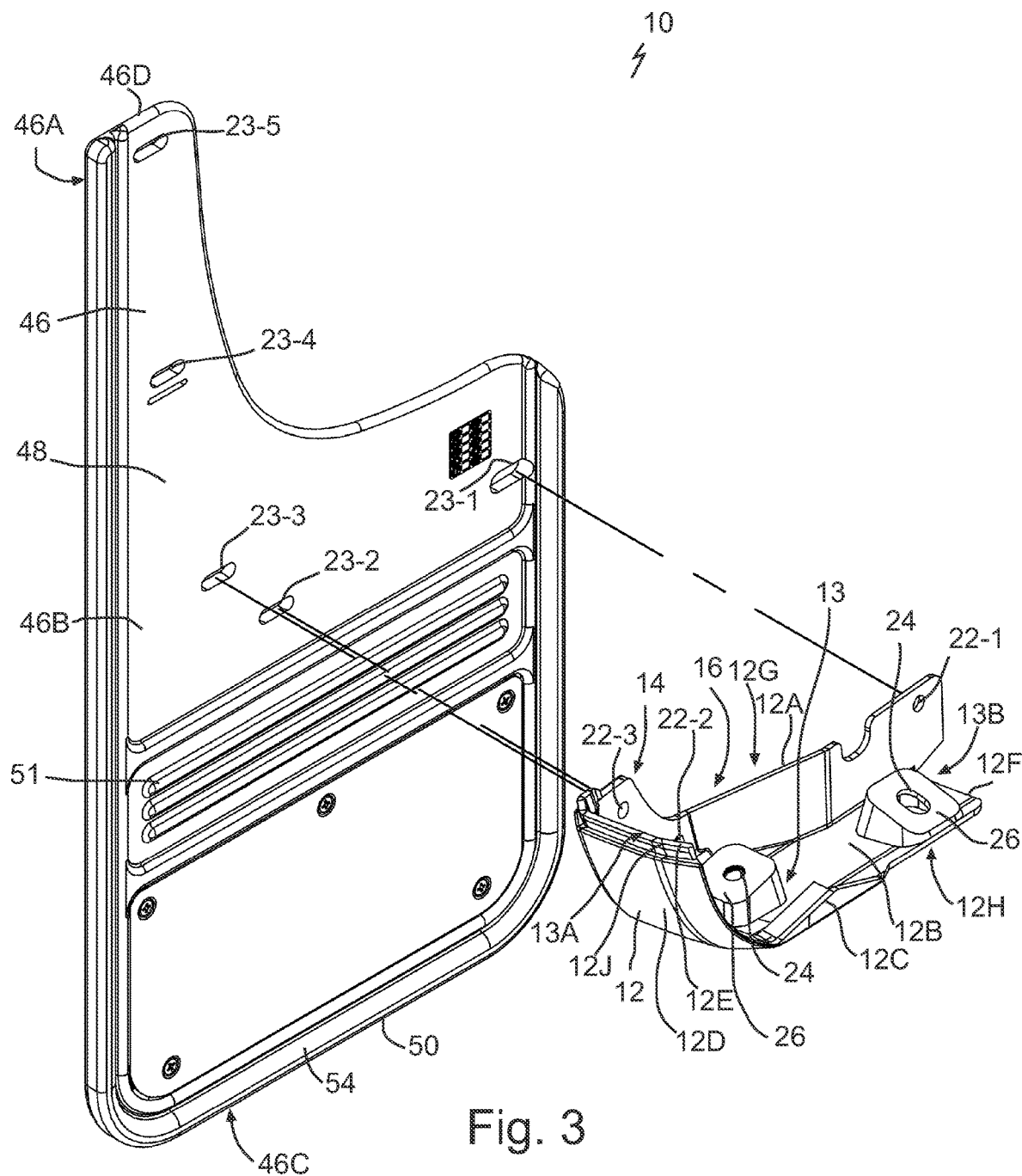
FIG. 3 is a rear isometric exploded view of the fender base cap bracket of FIG. 1 and a mud flap.

Referring to FIGS. 1 and 2, an apparatus 10 is introduced comprising a fender base cap bracket 12 shaped to cover a base 20A of a fender 20 of a vehicle. The fender base cap bracket 12 defines a fender mount 14 and a mud flap mount 16. In use the fender base cap bracket 12 may be secured to a base 20A of a fender 20 of a vehicle (for example the base 20A of the trailing end of the fender shown). A mud flap 46 may be secured to the mud flap mount 16 of the fender base cap bracket 12, for example before, after, or during the installation of the bracket 12 to the fender 20.

Figure 7:
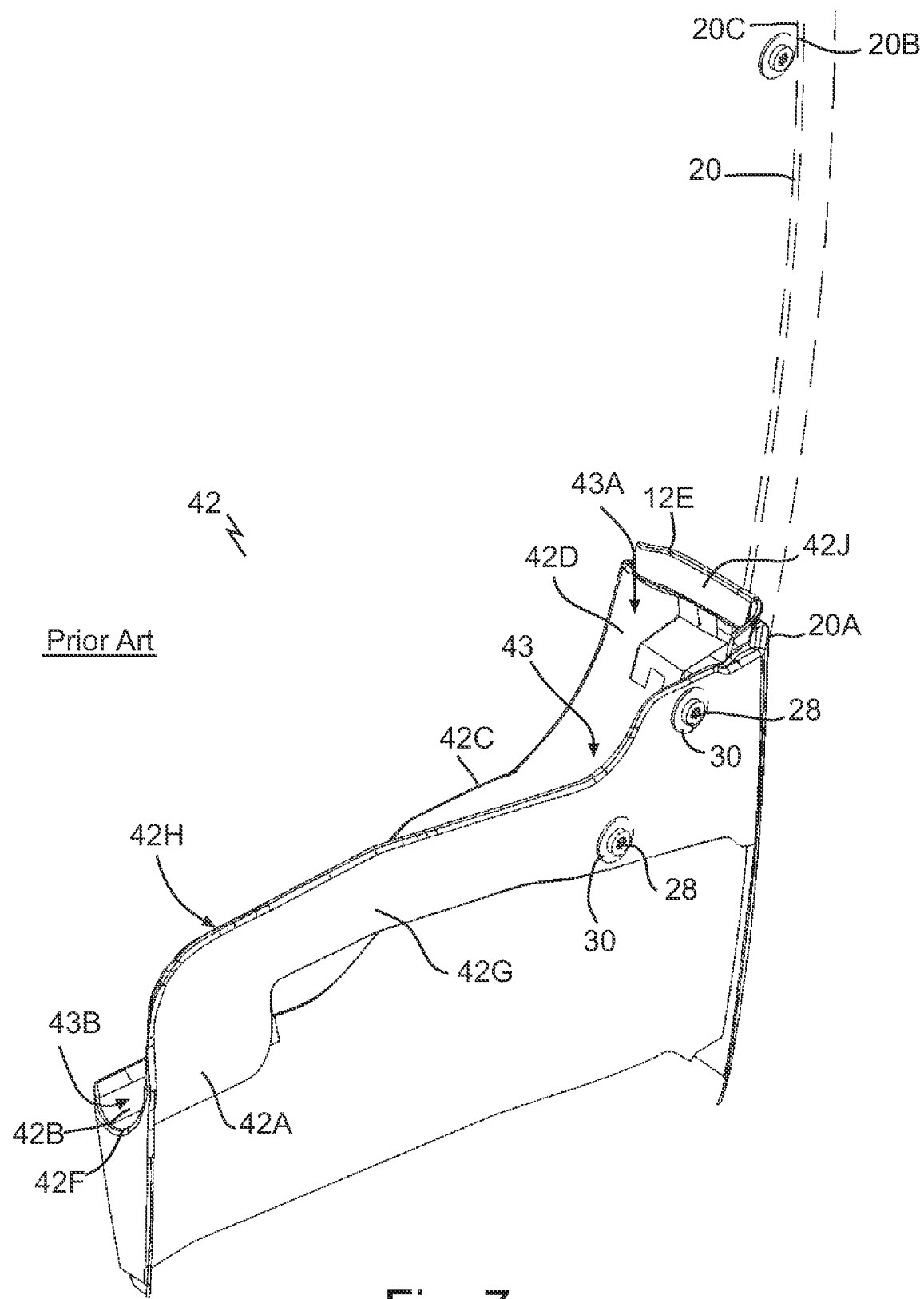
FIG. 7 is a front isometric view of a prior art fender splash guard from a 2019 GMC™ Sierra™, secured to the front left fender of the vehicle of FIG. 1.

Referring to FIGS. 1 and 7, in some cases the bracket 12 (FIG. 1) may be used to replace a cap 42 (FIG. 7) previously mounted to the base 20A of the fender 20 of the vehicle. Referring to FIG. 7, before securing the bracket 12 to the vehicle, the fender base cap 42 may be removed from the vehicle. The fender base cap 42 may form a splash guard or mud flap, such as an OEM provided or aftermarket device that the user wishes to upgrade or switch out. The structure of the bracket 12 may be similar or identical to the structure of the cap 42, except that the bracket 12 provides a mud flap mount 16 and may lack any splash guard or mud flap features integrally present in the cap 42. In some cases the bracket 12 by virtue of its function of covering the base 20A may appear to and may effectively form part of the base 20A (or an extension of) fender 20 once installed.

Referring to FIG. 7, as above, in the disclosed methods it may be desired to use bracket 12 to replace components of the vehicle, in particular an OEM-supplied fender base cap 42 or other trim element. For example, the OEM or aftermarket supplied fender base cap 42 or trim element may physically obstruct the installation or proper function of, or visually obstruct the appearance of, the mud flap if installed directly to the cap 42, potentially leading to a situation where if installed direct to cap 42 the mud flap would form a reduced or non-functional, or otherwise unattractive mud flap. In FIG. 7, the cap 42 shown is characteristic of an OEM-supplied cap such as that present on a 2019 GMC™ Sierra™ pickup truck, formed of a front side wall 42A, a base flange 42B, a rear side wall 42C, and defining an outboard channel end wall 42D. In the cap 42 shown, the outboard channel end wall 42D may define the front outboard end 42E opposite to an open inboard end 42F. The front side wall 42A may define a wheel facing side 42G, which is opposite to a face or side 42H (defined on rear side wall 42C) facing away from the wheel side 42G. The outboard channel end wall 42D may feature a lap tongue 42J that is structured to fit or nest within an outboard fender molding 20D. In some cases the end wall 42D is structured to form a base end of a molding 20D. Collectively, the front side wall 42A, base flange 42B, rear side wall 42C, and outboard channel end wall 42D may define a base receiving channel 43 with an outboard end 43A and inboard end 43B. The terms outboard and inboard in this document may refer to relative positions along a lateral axis perpendicular to a vertical plane, of vehicle travel, with the vertical plane being coincident with a central longitudinal axis of the vehicle. An outboard position is relatively closer to the lateral extremity of the vehicle than an inboard position, and in some cases, an outboard position itself defines the lateral extremity of the vehicle.

Referring to FIGS. 1-6, the fender base cap bracket 12 may have a suitable structure for functioning as a cap. The bracket 12 may have a front side wall 12A and a base flange 12B. The side wall 12A and flange 12B may collectively form a fender base receiving channel 13. The fender base receiving channel 13 may substantially or entirely conform to the shape of the fender base 20A end or the cap 42 (FIG. 7) previously installed thereon. The mud flap mount 16 may be formed in the front side wall 12A. The fender base cap bracket 12 may have a rear side wall 12C that cooperates with the front side wall 12A and base flange 12B to form the fender base receiving channel 13. The channel 13 may in use receive and follow the shape of the base 20A. The front or wheel facing side wall 12A may define a wheel facing side 12G, and the rear facing side wall 12C may form a side 12H that faces away from the wheel side 12H, for example may be oriented opposite to side 12G. One or more of the front side wall 12A, base flange 12B, channel 13, and rear side wall 12C may if present, have a similar or identical structure as the front side wall 42A, base flange 42B, channel 43, and rear side wall 42C of the OEM-supplied cap 42 (FIG. 7) or splash guard.

Referring to FIGS. 1-6, the fender base cap bracket 12 may have an outboard channel end wall 12D. End wall 12D may be structured to terminate an outboard end 13A of the fender base receiving channel 13. The channel 13 may extend between outboard end 13A and an inboard end 13B, proximal and distal, respectively, relative to a central axis (not shown) of the vehicle. The outboard channel end wall 12D may serve a structural purpose, for example to limit the lateral movement of or otherwise protect and position the fender base cap bracket 12. The outboard end wall 12D, in addition to one or more of walls 12A or 12C, may serve to prevent ingress of moisture or debris, or provide aerodynamic or cosmetic benefits. The channel 13 may receive the base 20A, for example such that an outboard end 20A-1 of base 20A abuts or sits adjacent end 13A, and an inboard end 20A-2 of base 20A abuts or sits adjacent end 13B. An undersurface 20A-3 of base end 20A abuts or sits along base flange 12B. Wheel facing side 20A-4 and a side 20A-5 facing away from the side 20A-4 may abut or sit adjacent front side wall 12A and rear side wall 12C, respectively.

Figure 4:
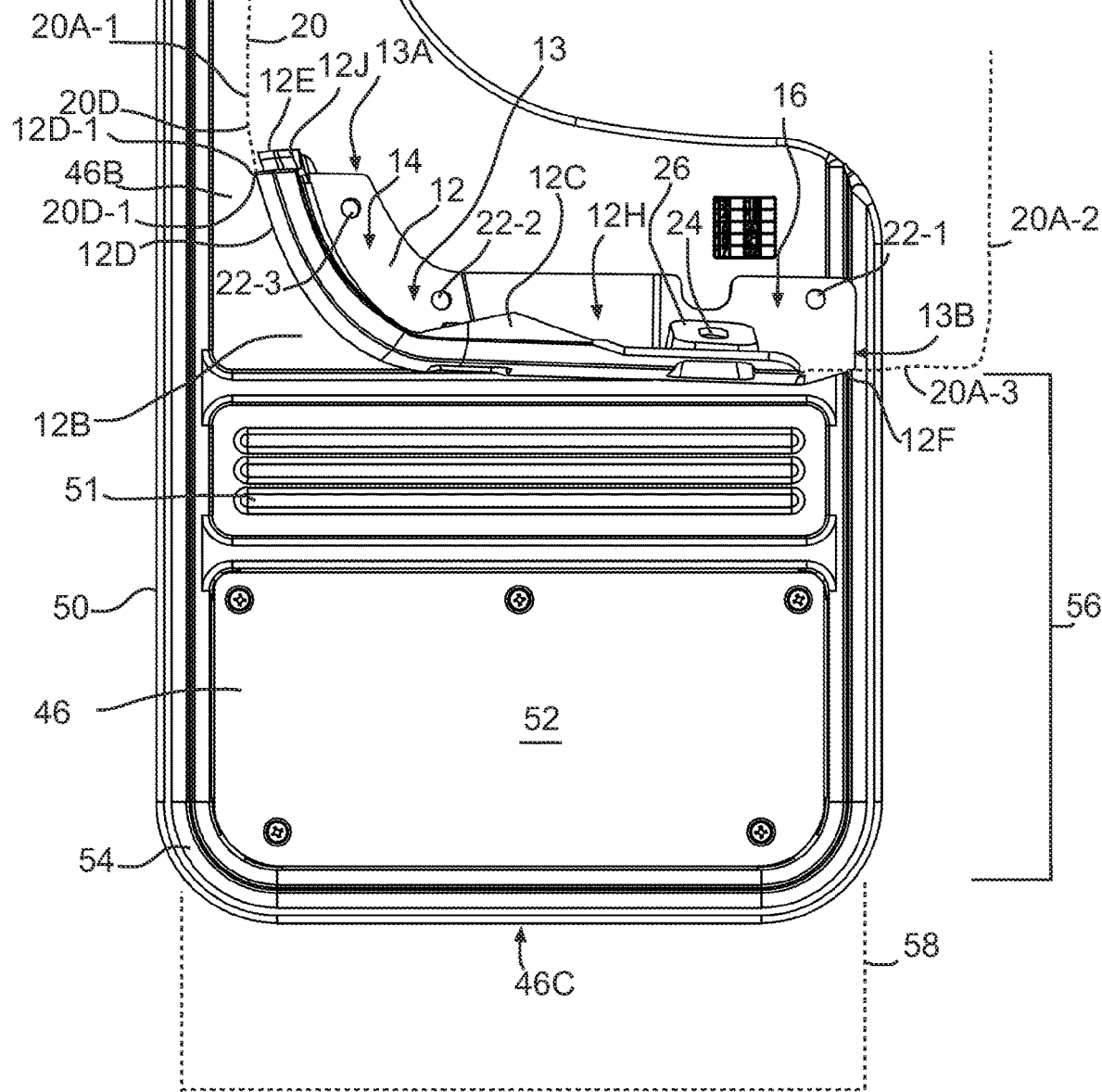
FIG. 4 is a rear elevation view of the fender base cap bracket and fender of FIG. 1, with a mud flap connected to the bracket.

The flap 46 may have various features. In the embodiment shown, flap 46 defines a wheel face 46A, a face 46B that faces away from the wheel face 46A, a base end 46C, and a top end 46D. The flap 46 may mount a decorative panel 52, usually visible from the rear of the vehicle (mounted in face 46B). Flap 46 may have reinforced internal ridges 51 and reinforced perimeter ridges 54. It may have other raised features, embossing, decorations, or channels to guide the flow of water and mud. The flap 46 may be made of a suitable material, such as a resilient material for example molded rubber. Referring to FIG. 4, the flap 46 may depend below the base 20A a suitable flap depth 56, above the bottom of the wheel 58 and off the ground surface.

Referring to FIGS. 1 and 4, the outboard end wall 12D may be structured to form a portion of a fender molding 20D. Referring to FIG. 4, the base flange 12B and the outboard end wall 12D of the bracket 12 may collectively form a J-shaped profile, for example defined from an inboard end 12F of the base flange 12B up to and including the outboard end 12E of the bracket 12. A tongue 12J may be provided at outboard end 12E of bracket 12, for example to extend upward in use to fit or nest inset under the edge 20C of the lip 20B to produce an attractive finish, for example to permit abutment of base shelf 20D-1 and top shoulder 12D of fender 20 and bracket 12, respectively, to provide a flush outer surface. The lap tongue 12J, like tongue 42J, may be structured to fit within an outboard fender molding 20D. In some cases the end wall 42D is structured to form a base end of a molding 20D or fender flare. The end wall 42D may be located at the lateral extremity of the vehicle (and thus form part of the external appearance and shell of the vehicle), or may be located relatively inboard of one or more components that form the lateral extremity for example the wall 12D is located inwardly of the quarter panel or other body panel, or of the fender molding 20D.

Referring to FIGS. 1-4, the fender mount 14 of the bracket 12 may comprise a plurality of fender mount fastener apertures 24. The apertures 24 may be formed in the base flange 12B of the bracket 12. Apertures 24 may be defined within fastener posts 26 structured in the base flange 12B. Posts 26 may provide structure and rigidity to the body of the bracket 12. Posts 26 may provide passages that align the fasteners 34 with the corresponding apertures in the fender during insertion. For example, as shown the posts 26 are angled slightly from vertical based on the entry axes provided in the fender for installation of the OEM cap 42. The apertures 24 may be structured to permit corresponding fasteners 34 to be inserted from below upward into the base 20A (underside) of the fender 20. Fastener posts 26 may be countersunk, for example to inset and conceal the head of a fastener for cosmetic and functional reasons, permit the use of a shorter fastener, fix the bracket 12 more rigidly, and/or protect a fastener from corrosion. Referring to FIG. 1, a plurality of fender mounting fasteners 34 may secure the bracket 12 to the vehicle. The apertures 24 may be shaped to accommodate a fastener 34 (FIG. 1) such as a screw, bolt (with or without a nut) nail, or rivet. For example, a slot or hole may be used. Apertures 24 may be circular as shown, or they may be oblong, elongate, or oval-shaped, for instance to permit some adjustment of the position of the bracket 12. Fasteners 34 may for instance be machine screws or self-tapping screws. Washers 30 may also be used. Apertures 24 may have a suitable structure, such as a threaded, textured, or smooth bore.

Figure 10:
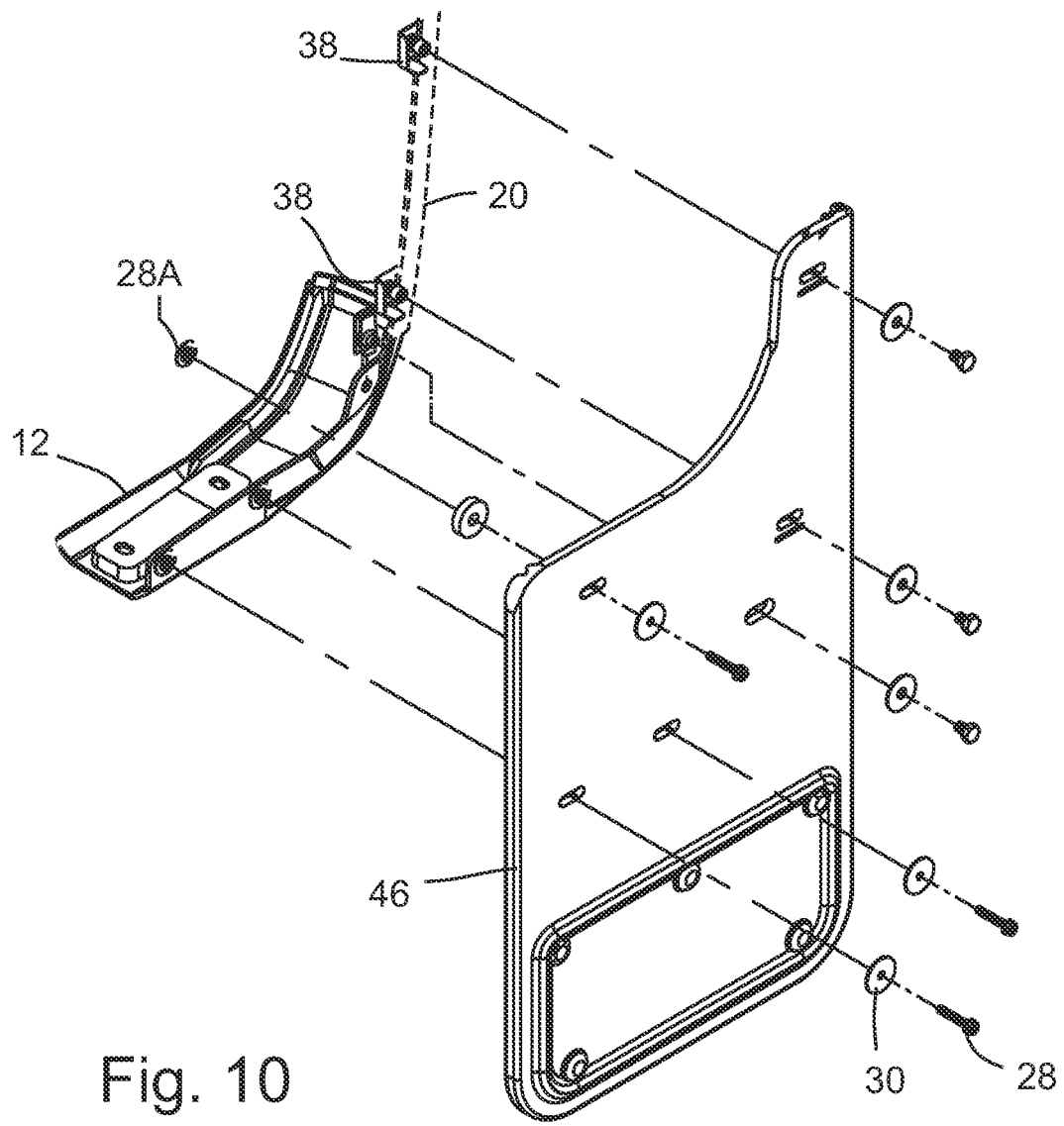
FIG. 10 is a front isometric exploded view of another embodiment of a mud flap and cap bracket combination, with the outline of a vehicle fender shown in dashed lines.

Referring to FIGS. 1-4, the mud flap mount 16 of the bracket 12 may comprise a plurality of mud flap mount fastener apertures 22. Apertures 22 may be formed in a suitable location such as the front side wall 12A, which may form a flange that hugs the base 20A while forming a structure with which to align and direct appropriate insertion of fasteners 28. Apertures 22 may permit the passage of fasteners, as shown in FIG. 2 in which apparatus 10 comprises a plurality of mud flap mounting fasteners 28 securing the mud flap 46 to the mud flap mount 16. A method of mounting the mud flap 46 to a vehicle may comprise inserting fasteners 28 through cooperating apertures, for instance apertures 23-1 and 22-1 in the mud flap 46 and the mud flap mount 16, respectively. The method may also comprise securing the mud flap 46 by inserting fasteners, for example machine screws or self-tapping screws, through cooperating aligned apertures in both the mud flap 46 and the fender 20. Apertures in the fender 20 may be provided for mounting the OEM cap 42, and may be leveraged for mounting the bracket 12 and/or the mud flap 46. In other cases, apertures may be formed in the fender 20 during installation, for example by a user drilling such apertures in the base 20A of the fender 20. The apertures 22 may be shaped to accommodate a fastener 28 such as a screw, bolt (with or without a nut 28A—see FIG. 10 for example), nail, or rivet. For example, a slot or hole may be used. Apertures 22 may be circular as shown, or they may be oblong, elongate, or oval-shaped, for instance to permit some adjustment of the position of the mud flap 46. Fasteners 28 may for instance be machine screws or self-tapping screws. Washers 30 may also be used. Apertures 22 may have a suitable structure, such as a threaded, textured, or smooth bore.

Referring to FIGS. 1-6, the structure of apertures 22 in the bracket 12 may be supplemented with additional measures to secure the mud flap to the bracket 12 and/or fender 20. The flap 46 may be secured with fasteners other than those provided for securing the OEM-supplied cap 42 structure to the vehicle, or the structure of the cap 42 may require additional support to handle the weight and bulk of the mud flap 46. A user may desire additional structure to ensure firm retention of the mud flap 46, to eliminate gaps between faying surfaces, or to prevent locally overloading the bracket 12, or for other purposes. For instance, FIG. 2 shows apparatus 10 comprising a spring nut clip 36 mounted to the front side wall 12A. A spring nut clip or like fastener receiver may be of advantage in some cases, for example if the front side wall 12A bracket 12 is formed from a relatively thin-walled material such as folded steel sheet or a thin injection-molded flange in which it would otherwise be difficult to create a female thread. In the embodiment shown, a spring nut clip 36 may have parallel clip arms 36A resiliently biased together to slid over and pinch the front side wall 12A of bracket 12. The clip arms 36A may hold the clip 36 in place during installation and support a threaded aperture 36B, which collectively forms the mud flap mount fastener along with aperture 22-1. Thus, a mud flap 46 may be secured to the bracket 12 by inserting a fastener 28 through cooperating apertures 23-1 and 22-1 in the mud flap 46 and aperture 36B in a spring nut clip 36 mounted to the bracket 12. Other structures may be used in place of a spring nut clip, such as a threaded nut welded or adhered to the wall 12A.

Referring to FIGS. 1-6, additional support may be provided to supplement mud flap receiving apertures 22 in the bracket 12 to secure the mud flap to the fender 20. A user may desire to use fastening features additional to the OEM-supplied fasteners or mounting locations provided by apertures 22 in the bracket 12. Referring again to FIG. 2, a mud flap mounting clip 38 may be provided to mount directly to the fender 20. Clip 38 may be mounted to a lip 20B of a fender 20. Clip 38 may define a fastener aperture 22-4 that receives a mud flap mounting fastener 28 to secure the mud flap 46 to the fender 20. The clip 38 may form a spring clip with parallel clip arms that are resiliently biased together to slide over lip 20B. In the example shown, the clip 38 has a single arm 38A that in use is positioned behind the lip 20B, to sandwich the lip 20B between the arm 38A and the mud flap 46 when the fastener is tightened, to grip the lip 20B securely. The aperture 22-4 may comprise a threaded body 38B, or another fastening structure such as an interference bore. The clip 38 may fit over the edge 20C of the lip 20B, which may be an inboard-directed terminal portion of a sheet of metal used to form the fender. In some embodiments, the lip 20B may form part of the inner edge of a fender molding 20D. In the example shown, the mud flap 46 may be secured by inserting a fastener 28 through cooperating apertures 22-4 and 23-4 in the mud flap 46 and respective mud flap mounting clip 38 that is mounted to a lip 20B of the fender 20. Additional clips 38 may be used, such as in the embodiment of FIG. 10 where two clips 38 are used. Referring to FIGS. 1-6, a flange 29 may define aperture 22-5 that aligns with aperture 23-5 in mud flap 46 to receive a fastener 28. A tongue 38C may extend toward the mud flap 46 for alignment, for example to fit within a corresponding further slot or aperture 23-4A in the mud flap 46. or to otherwise grip the mud flap 46.

Figure 5:
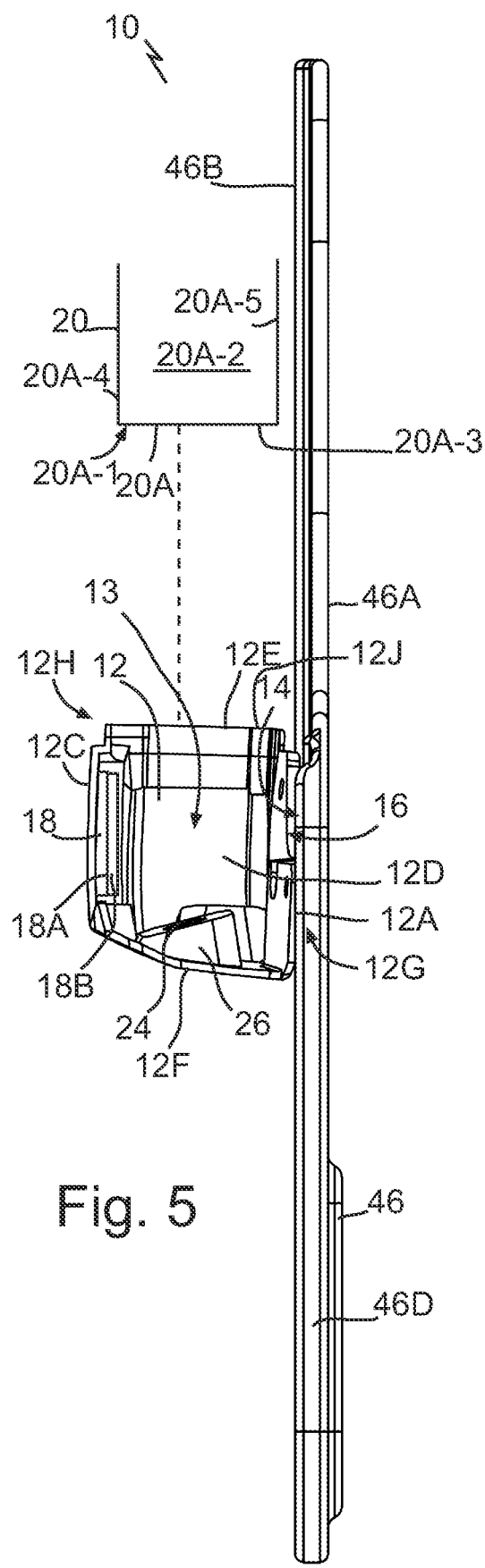
FIG. 5 is a right side exploded elevation view of the fender base cap bracket and mud flap of FIG. 4.
Figure 6:
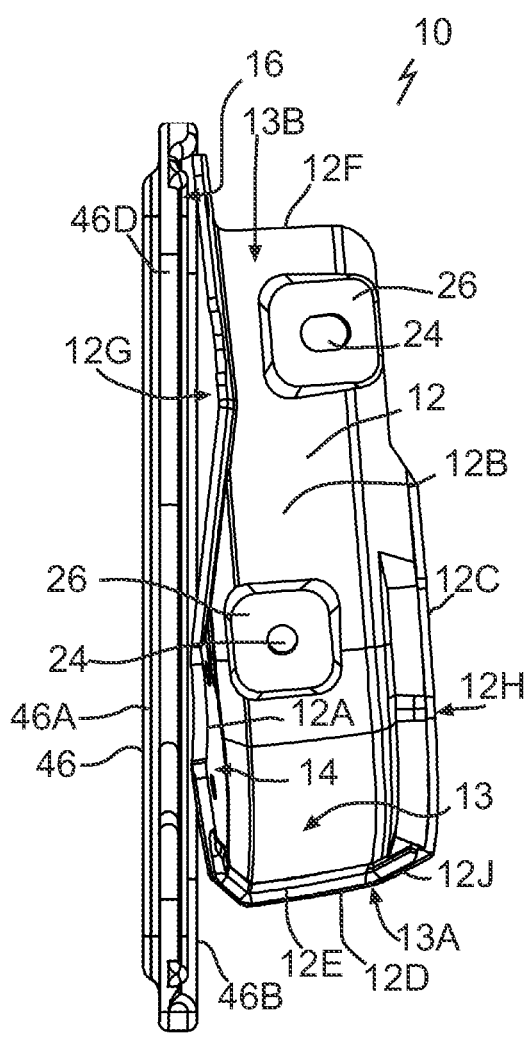
FIG. 6 is a top plan view of the fender base cap bracket and mud flap combination of FIG. 5, with the fender omitted for clarity.

The bracket 12 may be secured to the base 20A of the fender 20 by an adhesive. It may be desirable to seal faying surfaces between the bracket 12 and the base 20A of fender 20, for example for cosmetic reasons or to prevent the ingress of moisture and corrosion. Referring to FIG. 5, a rear side wall 12C of bracket 12 may comprise an adhesive 18. The adhesive 18 may be provided by a peel-and-stick strip comprising an adhesive layer 18A and a protective cover layer 18B. The previously described method of securing a bracket 12 may comprise securing a rear side wall 12C to the fender 20 via a peel-and-stick or other adhesive 18. The adhesive 18 may be located at a suitable location within the channel 13, or may be provided on an external surface of the bracket 12. In some cases, the cover layer 18B may not be removed until the bracket 12 is in position on the base 20A, to avoid premature adherence between bracket 12 and base 20A during install.

Figure 11:
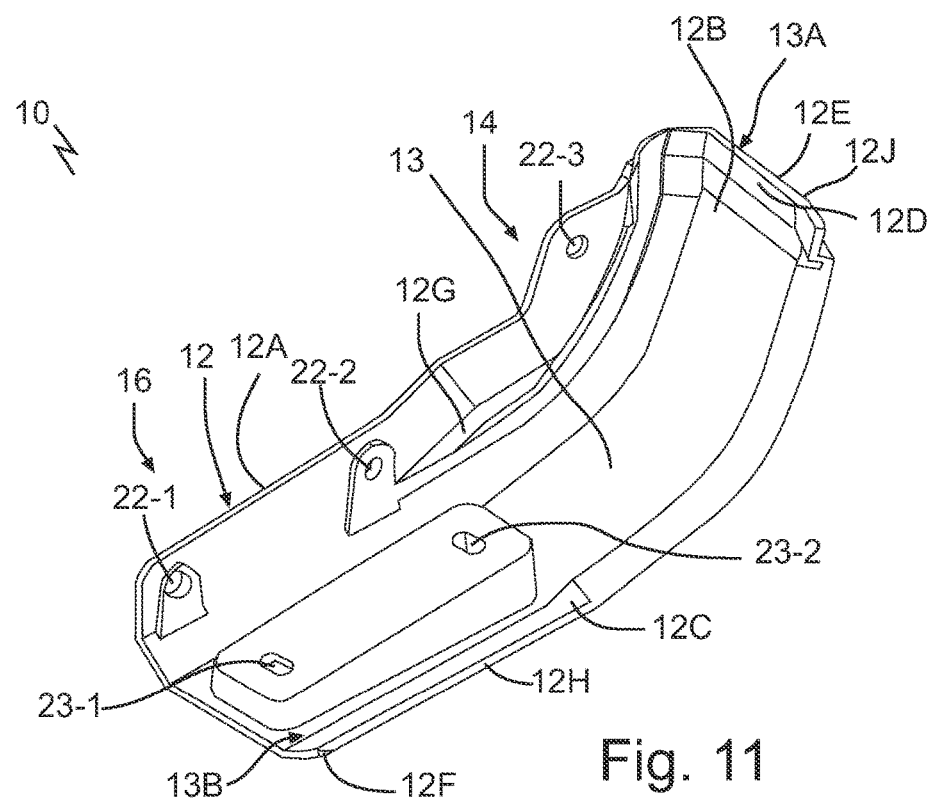
FIG. 11 is a left side isometric view of a fender base cap bracket for a 2020 1500 GMC™ truck.
Figure 12:
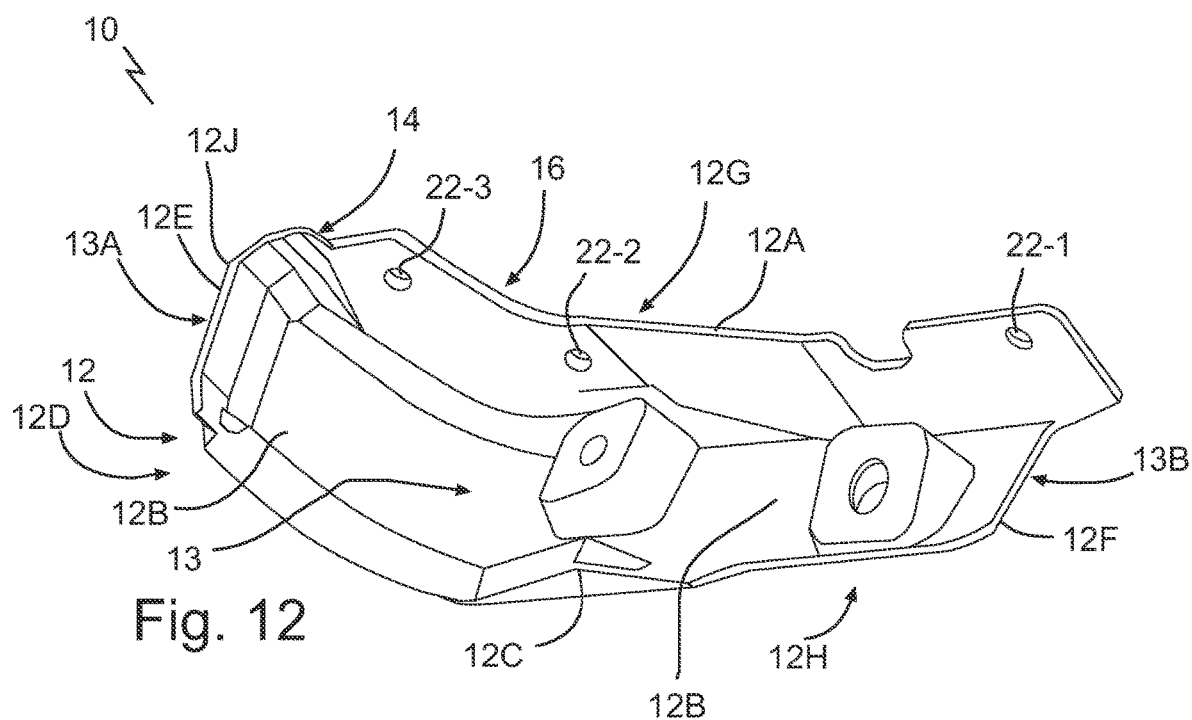
FIG. 12 is a left side view of a fender base cap bracket for a 2020 1500 GMC™ truck.

Referring to FIGS. 11 and 12, an embodiment of a finishing cap. The bracket 12 may be secured to the mud flap 46 by inserting a fastener 28 through corresponding apertures 22. The examples in FIGS. 11 and 12 may also be used and adapted for a 2020 2500/3500 GMC™ Truck. These designs have the same function as the other embodiments, except with a slightly different design due to mounting requirements being different between the models.

Referring to FIGS. 8, 8A, 8B, and 9, an embodiment of a mud flap 46 is shown with a partially or fully removable mud flap 46. The flap 46 may be divided into an upper hanger body 48 and a lower flap body 50. The subdivision of the flap 46 may be useful to the end user, for instance to permit the quick release of the relatively more functional and primarily visible part of the flap 46, i.e. the flap body 50, from the vehicle. This may be desirable to clean the flap body 50, to remove the body 50 for aerodynamic benefit, or for off-roading when flaps may snag on obstacles and when flying wheel debris poses less concern than in other contexts. A separate lower flap body 50 may also be easily and separately replaced after damage or wear.

Referring to FIGS. 8, 8A, 8B, and 9, a structure may be provided to permit quick-release of the flap 46, or in this case flap body 50. A quick-release function may be permitted by the provision of a track 60 on the lower edge of the hanger body 48, which confines a rail 62 provided at the top edge of the lower flap body 50. The lower flap body 50 may be slidably inserted into the track 60 from an outboard position in an inboard direction, and in some cases with the fit between track 60 and rail 62 being suitably loose that lower flap body 50 may be installed by hand. When the lower flap body 50 is in position, the body 50 may be locked in place. For example, a locking cap 64 may be slidably inserted from above at the outboard end of rail 62. The locking cap 64 may be equipped with parallel rails 66 to travel along a track 70. Rails 66 may interfere with bosses 68 positioned along track 70, for a friction fit. Passage of cap 64 over bosses 68 may act as a detent and prevent inadvertent removal of cap 64. The cap 64 may also be sized to create an interference fit or close-fitting sliding fit that may squeeze the part of lower flap body 50 that is within track 60. The cap 64 may be removed by upward pressure on a finger ridge 65 sufficient to dislodge the cap 64 from the detents (bosses 68). Other locking devices may be used such as a latch, a wingnut, or a pin system.

The embodiment of FIG. 8 also demonstrates an example of an offset provided in the flap 46. An offset may be provided to laterally space the flap 46, in this case the flap body 50, away from the tire in use, to improve clearance between tire, flap, and ground. The offset may be provided by use of an offset shelf 72 may be provided along hanger body 48 or flap body 50.

Bracket 12 and/or flap 46 may be provided as part of a kit, for example as an aftermarket automotive part kit. Referring to FIG. 1, the fender base cap bracket 12 may be an element of a kit, i.e. a kit containing bracket 12 shaped to cover a base 20A of a fender 20 of a vehicle, the bracket 12 having a fender mount 14 defined on the bracket 12, and a mud flap mount 16 defined on the bracket 12. The kit may also comprise a mud flap.

A user may wish to repurpose OEM-supplied fasteners, such as bolts, that are otherwise used to join components of the fender, for example to secure a wheel well to a fender or to a surface of a quarter panel that acts as a fender. It may be advantageous to repurpose OEM-supplied fasteners and fastener holes, to avoid a need to create new holes in the body of the vehicle. A related method of securing a mud flap involves repurposing an OEM-supplied fastener hole but to replace an OEM-supplied fastener with a fastener supplied as part of an aftermarket mud flap installation kit. Repurposing OEM-supplied fasteners or fastener holes may have cosmetic benefit by preventing gaps between the mud flap and fender or wheel well.

Referring to FIGS. 1-7, an exemplary method of installation of a mud flap 46 is now described. The wheel may or may not be removed. Referring to FIG. 7, a cap 42 may be removed from a vehicle fender 20, for example by unscrewing and removing fasteners such as fasteners 28 from cap 42. 1. In the case of a 2019 GMC™ Sierra™, the user may remove the four factory screws (fasteners 28 and 34) from the existing factory guard or cap 42, setting the screws aside for later reinstallation. In the case of the Sierra™, because there is no external access to the interior push pin like on the rear guard, the front guard may be pulled off by hand. Referring to FIGS. 1-6, the bracket 12 may then be installed to the base 20A of the fender 20. The user may slightly peel back a cover layer 18B of adhesive tape on the finishing cap and fold back so it can be fully peeled after the bracket 12 is in place. The bracket 12 may be positioned over the base 20A, for example ensuring the top lip of the bracket 12 slides under the fender molding. The user may then reinstall the four factory screws (fasteners 28 and 34) to secure the bracket 12. The user should take care not to overtighten the screws. Once in place, the user may finish peeling the cover layer 18B off the adhesive layer 18A, pressing firmly on the bottom and side of the finishing cap bracket 12 to ensure a proper seal. The procedure may be repeated on both the passenger and driver's side, on both the front and rear fenders, as desired.

The brackets 12 disclosed here may be used on suitable vehicles, such as the Sierra or Silverado models, in addition to any other model of truck, car, or other automobile. In one case the brackets are used on a 2020 2500 or 3500 Chevrolet Silverado.

Referring to FIGS. 1-6, the mud flap 46 may be installed at a suitable point in the method, for example before or (as shown) after installation of the cap bracket 12. In the case of the 2019 Sierra™, the factory screw (fastener 28) may be removed from wheel well hole or aperture 22-5 provided in flange 29. Spring nut clip 36 may be installed over aperture 22-1. The mud flap 46 may be secured using fasteners 28 (bolts with washers 30) through apertures 23-2 and 23-3 into apertures 22-2 and 22-3, respectively, for example only loosely securing such fasteners 28 at this point. Mount clip 38 may be held in place behind the lip 20B of fender 20, and the factory screw (fastener 28) passed through apertures 23-4 and 22-4 to secure the mud flap 46 direct to the fender 20. The mud flap 46 may be checked for vertical level at a suitable point in the method, such as at the present point, for example using a bubble level or other levelling tool. Fasteners 28 may be tightened. The mud flap 46 may be secured using a fastener 28, such as a bolt, with a washer 30 through apertures 22-5 and 23-5. The mud flap 46 may be secured by spring nut clip 36 on the plastic cap hole or aperture 22-1, using a fastener 28 passed through apertures 22-1 and 23-1. Fasteners may be tightened to secure the flap and bracket in place.

Referring to FIGS. 13-16, the cap bracket 12 may be installed at a suitable location on the fender 20. Referring to FIG. 16, a bracket 12" is shown installed at a rear 20E of the fender 20, while a bracket 12' is shown installed at a front 20F of the fender 20. The brackets 12' and 12" may have any one or more of the same or analogous features. Referring to FIG. 16, a bracket 12" at a rear 20E may replace a mud guard, splash guard, or other OEM part on the fender 20. Similarly, the bracket 12' at the front 20F may replace a similar component, such as a protector or mud guard at the front of the wheel well. In some newer models of trucks, OEM guards have been found to fit poorly, showing gaps between the guard and an outboard wall of a fender molding. Both brackets 12' and 12" may mount mud flaps. Referring to FIGS. 13-15, an example is shown of a bracket 12 that may be installed at a front 20F of the fender 12. The bracket 12 shown may lack a mud flap mount, or may have a mud flap mount. The bracket 12 may have a J-shape as shown. The bracket 12 may have a plurality of fender mount fastener apertures 24, for receiving fasteners 34. The apertures 24 may be inset within a slot 91 in a base of the bracket 12. The bracket 12 may protect the underside, and/or the inside, of the front or rear of the fender 20, better than the OEM part that is normally positioned in its place. The bracket 12 may also protect the wheel 58, and may mount a front mud flap (not shown).

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An apparatus comprising:
  a fender base cap bracket shaped to cover a base of a fender of a vehicle;
  a fender mount defined on the fender base cap bracket;
  a mud flap mount defined on the fender base cap bracket; and
  in which the fender base cap bracket has a front side wall, a rear side wall, and a base flange that cooperate to collectively form a fender base receiving channel, with the mud flap mount formed in the front side wall, the fender base cap bracket having an outboard channel end wall that is structured to terminate an outboard end of the fender base receiving channel, and in which the base flange and the outboard channel end wall collectively form a J-shaped profile from an inboard end of the base flange up to and including the outboard channel end wall.

2. The apparatus of claim 1 in which the rear side wall comprises an adhesive, in which the adhesive is part of a peel and stick strip.

3. The apparatus of claim 1 in which the outboard channel end wall is structured to form a portion of a fender molding.

4. The apparatus of claim 1 in which the fender mount comprises a plurality of fender mount fastener receiving apertures, in which the fender mount fastener receiving apertures are formed in the base flange.

5. The apparatus of claim 4 in which the fender mount fastener receiving apertures are defined within fastener posts structured in the base flange.

6. The apparatus of claim 1 in which the mud flap mount comprises a plurality of mud flap mount fastener receiving apertures, in which the mud flap mount fastener receiving apertures are formed in the front side wall.

7. The apparatus of claim 1 further comprising a mud flap secured to the mud flap mount, and further comprising a plurality of mud flap mounting fasteners securing the mud flap to the mud flap mount.

8. The apparatus of claim 7 in which the fender mount of the fender base cap bracket is secured to a fender of a vehicle, and further comprising a plurality of fender mounting fasteners securing the fender base cap bracket to the vehicle.

9. The apparatus of claim 8 further comprising a mud flap mounting clip that is mounted to a lip of the fender and defines a fender mount fastener aperture that receives a mud flap mounting fastener to secure the mud flap to the fender.

10. A method comprising securing a fender base cap bracket to a base of a fender of a vehicle, such that the fender base cap bracket covers the base of the fender, the fender base cap bracket defining a mud flap mount; and
  in which the fender base cap bracket has a front side wall, a rear side wall, and a base flange that cooperate to collectively form a fender base receiving channel, with the mud flap mount formed in the front side wall, the fender base cap bracket having an outboard channel end wall that is structured to terminate an outboard end of the fender base receiving channel, and in which the base flange and the outboard channel end wall collectively form a J-shaped profile from an inboard end of the base flange up to and including the outboard channel end wall.

11. The method of claim 10 further comprising securing a mud flap to the mud flap mount of the fender base cap bracket, in which securing the mud flap comprises securing fasteners through cooperating apertures in the mud flap and the fender.

12. The method of claim 11 in which securing the mud flap comprises securing mud flap mounting fasteners through cooperating apertures in the mud flap and the mud flap mount, in which securing the mud flap comprises securing a fastener through cooperating apertures in the mud flap and a spring nut clip mounted to the fender base cap bracket.

13. The method of claim 10 in which the outboard channel end wall terminates the outboard end of the fender base receiving channel flush with an outboard wall of a fender molding of the fender.

14. The method of claim 10 in which the fender base cap bracket is secured to the base of the fender of the vehicle to replace a fender base cap previously mounted to the base of the fender of the vehicle, and further comprising, before securing the fender base cap bracket to the vehicle, removing the fender base cap from the vehicle.

* * * * *